Oct. 22, 1968    N. O. SUNDBERG    3,406,851
SELF-LOADING POWER DRIVEN DUMP VEHICLES
Filed Aug. 20, 1965    5 Sheets-Sheet 1

INVENTOR.
Nils Olof Sundberg
BY

Oct. 22, 1968   N. O. SUNDBERG   3,406,851
SELF-LOADING POWER DRIVEN DUMP VEHICLES
Filed Aug. 20, 1965                             5 Sheets-Sheet 2

INVENTOR.
Nils Olof Sundberg
BY

Oct. 22, 1968   N. O. SUNDBERG   3,406,851
SELF-LOADING POWER DRIVEN DUMP VEHICLES
Filed Aug. 20, 1965   5 Sheets-Sheet 3

INVENTOR.
Nils Olof Sundberg
BY
Attorney

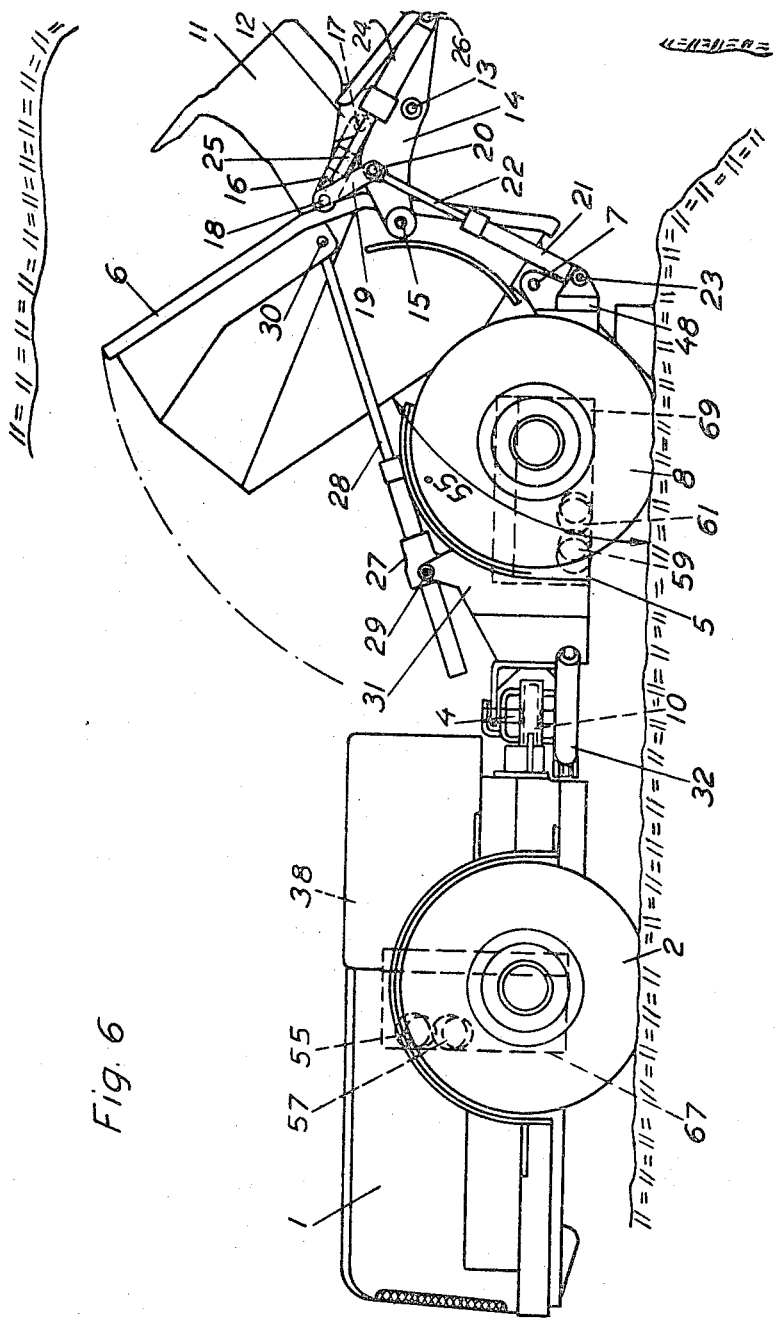

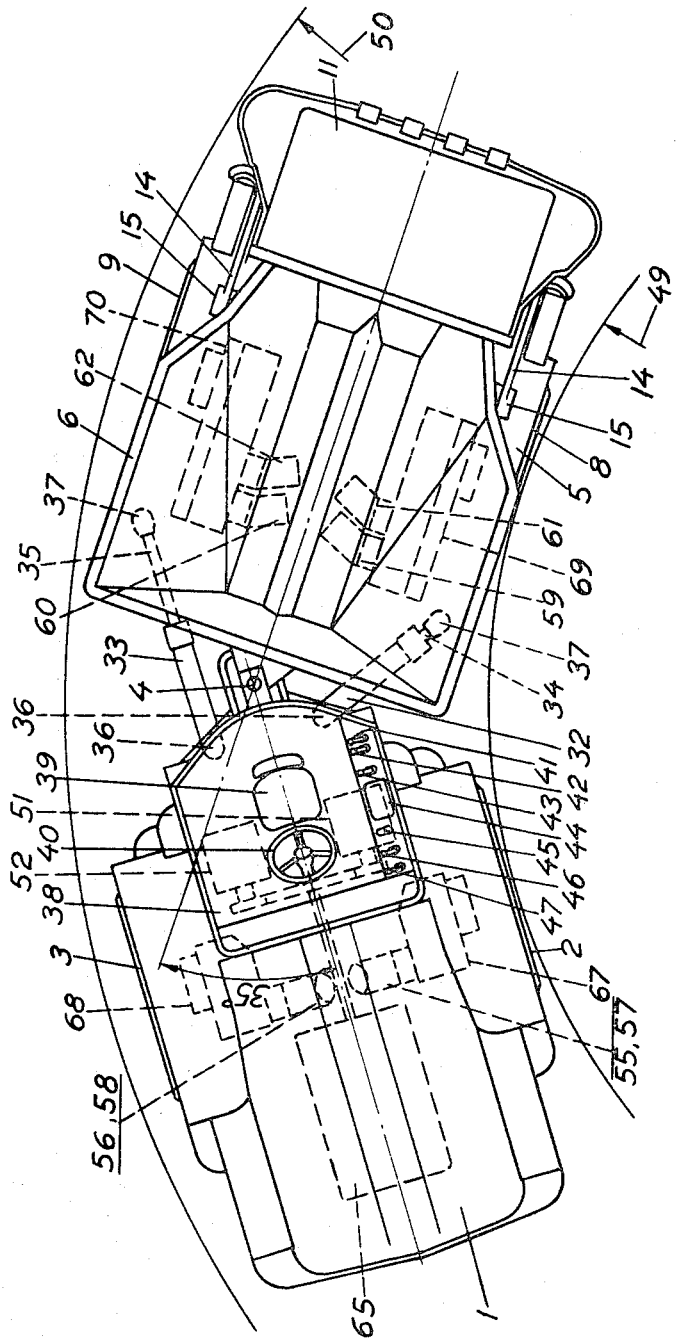

United States Patent Office 3,406,851
Patented Oct. 22, 1968

3,406,851
SELF-LOADING POWER DRIVEN DUMP VEHICLES
Nils Olof Sundberg, Orebro, Sweden, assignor to Atlas
Copco Aktiebolag, Nacka, Sweden, a corporation of
Sweden
Filed Aug. 20, 1965, Ser. No. 481,265
Claims priority, application Sweden, Aug. 19, 1964,
10,022/64
3 Claims. (Cl. 214—501)

ABSTRACT OF THE DISCLOSURE

A self-loading power driven dump vehicle particularly adapted for the loading and transportation of material in mines, tunnels and other places. The apparatus has a wheeled chassis composed of a motor-carrying section and a container section pivotally connected thereto. Two pairs of wheels carry the chassis frame; a power shovel is pivoted on the container section and the axis of one of the pairs of wheels is situated between the pivot which couples the two chassis sections together and the pivot for the power shovel, and power cylinders and linkage for moving the shovel from a collecting position to discharge position are pivotally mounted on the chassis and container, and with such cylinders and linkage disposed inside of the vehicle motion profile as defined by the outer side of the last-mentioned pair of wheels.

---

This invention relates to self-loading power driven dump vehicles which are adapted for loading and transportation of material in mines, tunnels and other working places. One object of the invention is to provide a vehicle of this type which is movable within relatively close quarters and which requires a comparatively low head room so that it may be used under ground in mines, tunnels and other localities and which has a considerable carrying capacity. A further object of the invention is to provide a vehicle of this type which can be operated by a single man for loading of a container carried by the vehicle and for transportation and for dumping of the vehicle container. A further object of the invention is to provide a vehicle of the type described in which the necessary power cylinders, links, arms and pressure fluid conduits are arranged in spaces in the vehicle where they are easily accessible and still well protected against damage. A further object of the invention is to provide a vehicle of the type described in which big traction wheels of the vehicle protect the linkage, power cylinders and power lines for the loading shovel and the container against damage. A further object of the invention is to provide a vehicle of the type described which comprises a power unit and a container unit hinged together for steering purposes and for accommodating the vehicle to uneven road conditions. For the above and other purposes I provide a self-loading power driven dump vehicle having a chassis frame, a material container pivotally mounted on said chassis frame at one dumping end of the chassis frame, and a power shovel pivotally mounted on said container at said dumping end.

Figure 1:
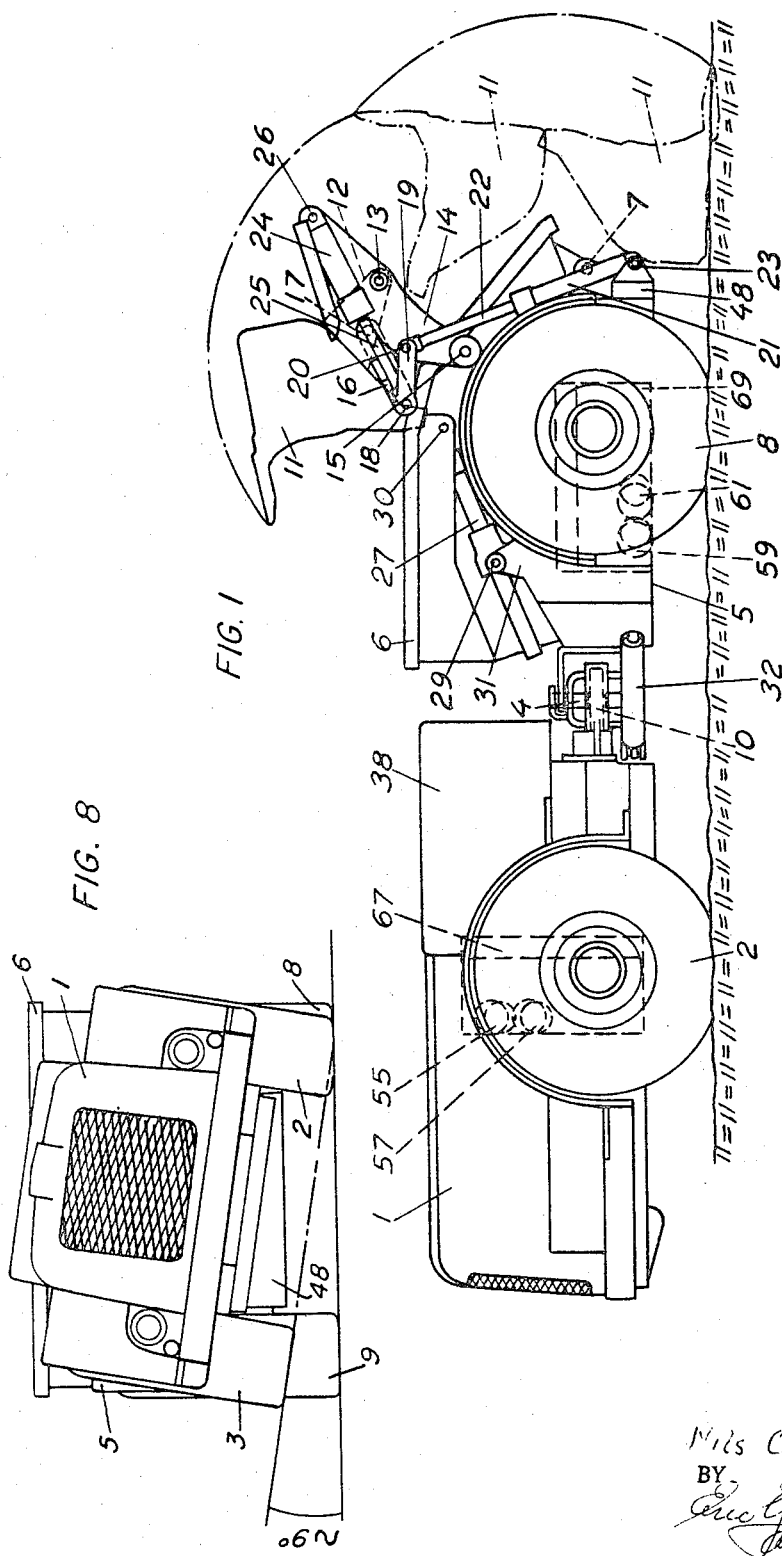
Figure 2:
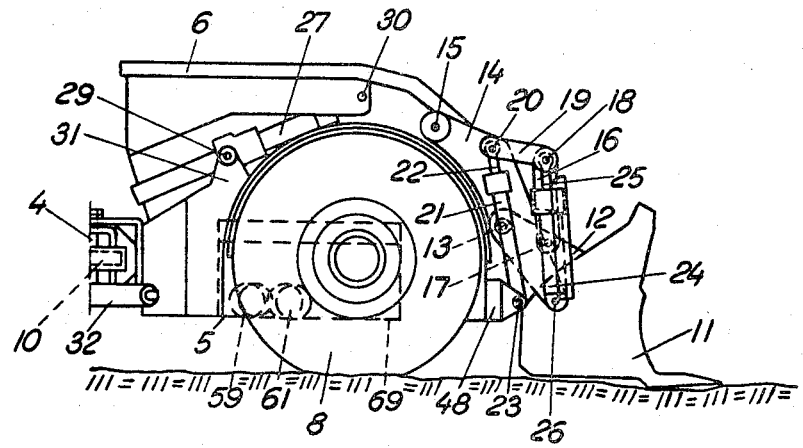
Figure 3:
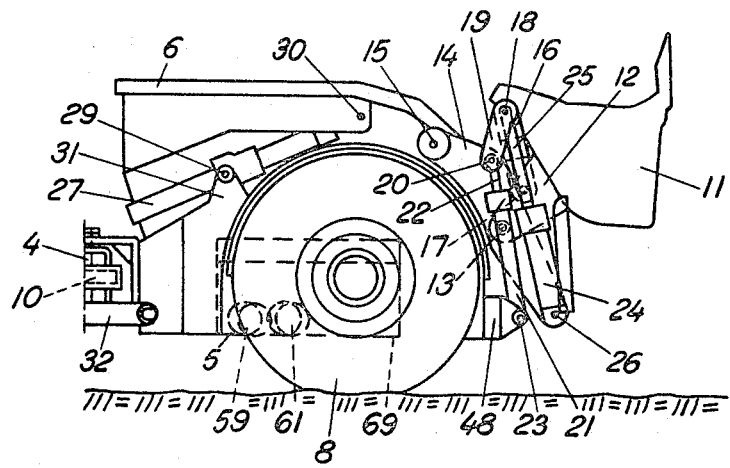
Figure 4:
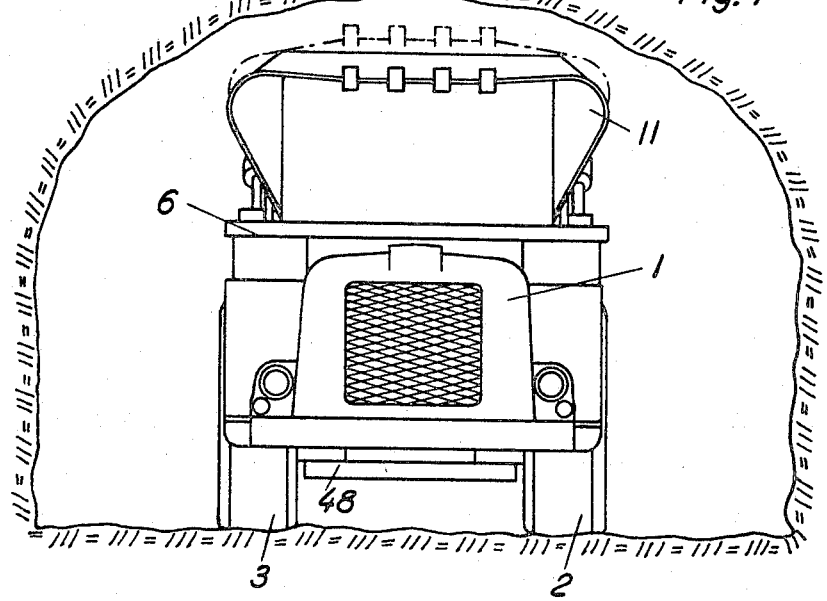
Figure 5:
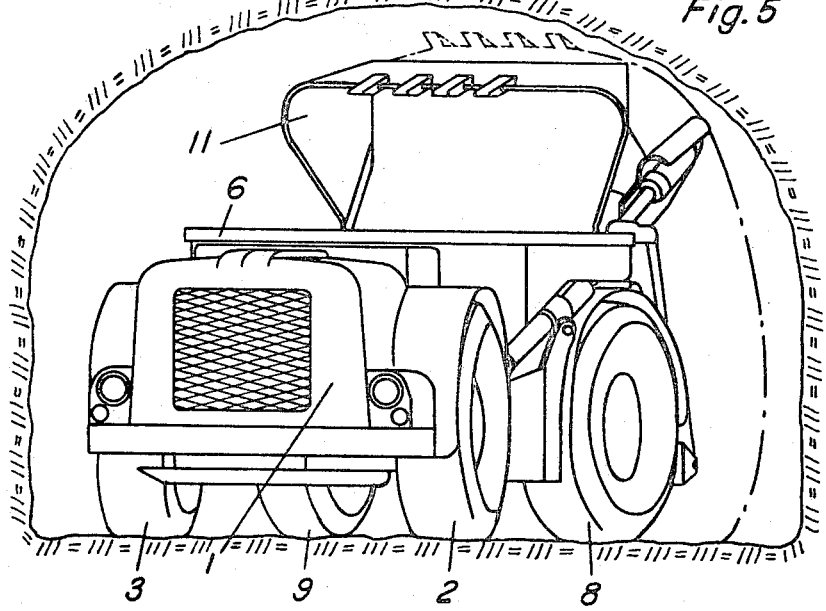

In the accompanying drawings a self-loading power driven dump vehicle according to the invention is illustrated by way of example. FIG. 1 is a side view of the vehicle which comprises a motor unit and a container unit and which is shown in various positions during loading operation with the shovel shown in full lines in the position which it takes when it discharges its contents into the container and in chain dotted lines in the digging position and an intermediate position during the loading cycle. FIG. 2 illustrates the container unit of the vehicle with the power shovel in digging position, and FIG. 3 is a view of the container unit with the power shovel in a raised intermediate position. FIG. 4 is an end view of the vehicle looking towards the motor unit with the power shovel in raised position. FIG. 5 is a perspective view of the vehicle looking towards the motor end of the vehicle with the shovel in raised position. FIG. 6 is a side view of the vehicle with the shovel in raised position and with the container in dumping position. FIG. 7 is a plan view of the vehicle with the motor unit and the container unit in position for traveling through a curve. FIG. 8 is an end view of the vehicle looking against the motor unit and showing the motor unit twisted on a longitudinal axis relative to the continer unit which may happen when the vehicle moves over rough roads.

The self-loading power driven dump vehicle illustrated on the drawings comprises a two-wheeled motor unit 1 provided with two traction wheels 2 and 3 and having a chassis frame portion which carries preferably a diesel engine and one or more hydraulic pumps driven thereby. The chassis frame portion of the motor unit is pivotally connected to a chassis frame portion for the container unit 5 by means of a hinge connection having a vertical pivot 4. The chassis frame portion of the container unit is indicated at 48 and carries a container 6 which is pivotally mounted on trunnions 7 disposed at the dumping end of the container unit and enabling the container to be tilted towards the dumping end for dumping material in the container into a suitable mine pocket, a rail car or other receiver. The frame portion 48 is carried by two traction wheels 8, 9 mounted in bearings on the frame portion 48. The coupling which connects the container unit 5 and the motor unit 1 and which contains the vertical pivot 4 also contains a horizontal pivot 10 which permits the container unit 5 to be twisted relative to the motor unit 1 on a longitudinal axis within a certain angle which may for instance be about 9 degrees, as indicated in FIG. 8. The pivots 4 and 10 transfer a part of the container unit 5 load to the motor unit 1 so that a suitable distribution of weight on the traction wheels 2, 3 and 8, 9 is obtained.

The container 6 is swingable from the transportation position illustrated in FIG. 1 to a dumping position illustrated in FIG. 6 in which the contents of the container is dumped at the dumping end of the vehicle.

For loading of the container 6 a power shovel 11 is provided at the dumping end of the container 6 said power shovel being provided with an arm structure comprising two shovel arms 12 rigidly connected to the shovel 11 and pivotally mounted on trunnions 13 provided on a first pair of links 14, which at one end are pivotally mounted on trunnions 15 carried by the container 6 which has reduced breadth at this end to accommodate the arms and links. The shovel arms 12 furthermore carry a second pair of links 16 pivotally mounted on trunnions 17 on the shovel arms 12 at one end and connected pivotally at the opposite end through pivots 18 with a third pair of links 19 which are pivotally mounted on trunnions 20 carried by the first pair of links 14. Double-acting hydraulic cylinders 21 with pertaining pistons and piston rods 22 are pivotally mounted on trunnions 23 on the container chassis frame portion 48 and on the trunnions 20 on the links 14 so that the links 14 may swing upwards upon extension of the hydraulic cylinders 21, 22. The free ends of the links 14 are pivotally connected by hydraulic cylinders and rods 24, 25 with the pivots 18, the hydraulic cylinders 24, 25 being mounted on trunnions 26 on the links 14. The pivots 18 connect the links 16 and 19. Extension of the hydraulic cylinders 24, 25 swings the shovel 11 from digging position in FIG. 2 to the intermediate position in FIG. 3. The chassis frame portion 48 of the container unit 5 furthermore carries double-acting hydraulic cylinders 27 with piston and piston rods 28 which are swingably mounted on trunnions 29 on the chassis frame portion 48 and pivotally connected to the container 6 by means of pivots 30. The trunnions 29 are carried by lugs 31 formed on the container unit chassis frame portion 48.

In order to enable the vehicle to be steered the container unit and the motor unit are connected to each other by means of a pair of double-acting hydraulic cylinders 32, 33, FIG. 7, with pertaining positions and piston rods 34, 35, said cylinders being pivotally mounted on the motor unit at 36, 36 and at the container unit at 37, 37. Steering of the vehicle in one direction is obtained by supplying pressure oil at one side of the piston in the cylinder 32 and at the opposite side of the piston in the cylinder 33 and steering in the opposite direction is obtained by supplying pressure oil at the opposite sides of said pistons. Simultaneously the inactive sides of the pistons are connected to an oil return conduit.

The motor unit 1 is provided with an operator's compartment 38, FIG. 7, which is provided with a seat 39 for the operator and a steering wheel 40 for operating not illustrated valves controlling the pressure fluid supply to the steering cylinders 32, 33 as well as the fluid outlets from the steering cylinders 32, 33.

In FIG. 2 the power shovel 11 is illustrated in digging or loading position and the cylinders 21 and 24 are then completely contracted and the links 16, 19 and 14 take the positions illustrated in FIG. 2. Filling of the power shovel is obtained by moving the vehicle into the pile of material such as blasted rock or ore with the shovel in the position illustrated in FIG. 2 whereupon the shovel is raised from the position in FIG. 2 to the position illustrated in FIG. 3 by supplying pressure oil to the hydraulic cylinders 24 so that said cylinders expand to their full length. Since the cylinders 24 have larger diameter than the cylinders 21 this movement is carried out automatically when hydraulic pressure oil is supplied to both cylinders and when the cylinders 24 have expanded to full length the links 14 still take the dumped position illustrated in FIGS. 2 and 3 but the shovel is lifted to the intermediate position illustrated in FIG. 3 with the shovel opening turned upwards. The loaded shovel may then be swung to discharge position by pressure oil being supplied to the cylinders 21 and extension of said cylinders swings the shovel to the position illustrated in full lines in FIG. 1. In this position the shovel contents is discharged into the container 6 and by swinging the shovel more or less in over the container 6 the operator may control the degree of filling of the container 6.

The shovel movement is controlled by levers 41, 42 which control the pressure oil supply to the cylinders 21, 24 and the exhaust of oil from said cylinders. The lever 43 controls the supply and exhaust of pressure oil of the cylinders 27 and by means of the lever 43 the operator may swing the container 6 to the dumping position illustrated in FIG. 6. In this position the shovel 11 is kept swung upwards so that emptying of the container is carried out between the links 14 below the shovel 11 as obvious from FIG. 6. 44 in FIG. 7 is an instrument panel, 45 is a starter button for the diesel engine, and 46, 47 are levers controlling a transmission selector and a differential interlocking valve. 49 and 50 indicate the inner and outer turning radius of the smallest curve through which the vehicle illustrated on the drawings may be moved.

In FIG. 7 the steering wheel 40 and the operator's seat 39 are illustrated in a position which they take when the vehicle is arranged for transportation, i.e. when the vehicle is arranged for driving away from a loading station to an unloading station. For the loading operation the operator's seat 39 and the steering wheel 40 are turned around so that the operator faces the container 6. This arrangement is described in a separate application.

The illustrated vehicle has four-wheel-drive. Hydraulic liquid for the hydraulic motors which drive the wheels and for operating the various hydraulic cylinders is delivered by separate pumps which are driven by the diesel engine. Pressure liquid for the hydraulic motors which drive the wheels and for the hydraulic cylinders is supplied by separate pumps 51, 52 driven from a diesel engine 65 provided on the motor unit 1. The hydraulic pumps which feed the wheel motors may preferably have variable capacity and reversible direction of fluid flow whereas the hydraulic pumps delivering pressure liquid for the hydraulic cylinders may be gear pumps with fixed capacity at a certain number of revolutions. The hydraulic wheel motors 55–62 are conventional hydraulic motors which may be run forward or reverse according to the direction in which pressure liquid is supplied to the motor and said motors may be gear motors, slidable vane type motors or of other design. Two motors are provided for driving each one of the four driving wheels 2, 3, 8, 9 of the vehicle and each motor drives the pertaining wheel directly through a toothed gear transmission. As mentioned a pair of hydraulic motors 55, 57; 56, 58; 59, 61; 60, 62 is connected directly to the pertaining traction wheels through toothed gear transmissions provided in gear housings 67, 68, 69, 70. The motor 65 may be a diesel engine or any other combustion engine, electric engine, or an air motor. The motor 65 is started by means of the starter button 45 and as soon as the motor runs the hydraulic pumps are also running. When it is desired to run the vehicle at full speed the full capacity of the hydraulic pumps is supplied to one wheel motor at each wheel and when it is desired to run the vehicle at low speed with great traction force the hydraulic liquid delivered by the pumps is delivered to two wheel motors in parallel at each wheel, and for shifting from one way of operation to the other the shifter valve lever 46 may be operated. Such an arrangement is, however, old per se in connection with vehicles of this and other types and is therefore not described in detail. The differential locking valve 47 when operated causes the fluid flow to the left side wheel motors to be separated from the fluid flow to the right side wheel motors thereby providing hydraulically a differential interlock.

The vehicle above described and illustrated on the drawings should only be considered as an example and the invention may be modified in several different ways within the scope of the claims.

What we claim is:

1. A self-loading power driven dump vehicle having a chassis frame comprising a motor chassis portion and a container chassis portion and a hinge pivotally connecting one of said chassis portions to the other, a first pair of traction wheels carrying said motor chassis portion, a second pair of traction wheels carrying said container chassis portion, a motor on said motor chassis portion arranged to drive said wheels, a container on the container chassis portion pivotally mounted on the container chassis portion at one dumping end thereof opposite to said hinge, said container having a portion of reduced breadth at the dumping end, a power shovel pivotally mounted on said container at the dumping end side of the axis of the container chassis portion traction wheels, and pairs of links and power cylinders carried and disposed at the sides of the reduced portion of the container inside of the vehicle motion profile as defined by the outer sides of the container chassis traction wheels.

2. A self-loading power driven dump vehicle having a chassis frame comprising a motor chassis portion and a container chassis portion and a hinge pivotally connecting said chassis portions one to the other, a first pair of traction wheels carrying said motor chassis portion, a second pair of traction wheels carrying said container chassis portion, a motor on said motor chassis portion arranged to drive said wheels, a container on the container chassis portion pivotally mounted on the container chassis portion at one dumping end thereof opposite said hinge, a power shovel pivotally mounted on said container at the dumping end side of the axis of the container chassis portion traction wheels, the container having a portion of reduced breadth at the dumping end, said shovel being pivotally carried by a first pair of links pivotally mounted at the upper part of said reduced dumping portion of the container, a first pair of power cylinders pivotally mounted at the dumping end of said container chassis and pivotally connected to said first pair of links for swinging said links and said shovel to discharge position over said container, a pair of arms fixed on said shovel and pivotally mounted on said first pair of links, a second pair of power cylinders pivotally mounted on said first pair of links and pivotally connected to said shovel for swinging the shovel from digging position to a raised intermediate position on said first pair of links from which intermediate position said shovel is swung to discharge position by said first pair of power cylinders, said links and arms and first and second pairs of power cylinders being disposed at the sides of the reduced container portion at the dumping end of the container, and a third pair of power cylinders pivotally mounted on the container chassis remote from the dumping end and pivotally connected to the container for swinging the container upwardly to dump its material contents at the dumping end.

3. A vehicle according to claim 2, in which the shovel operating links and arms and power cylinders are disposed inside the vehicle motion profile defined by the outer sides of the container chassis traction wheels.

References Cited

UNITED STATES PATENTS

| | | | |
|---|---|---|---|
| 2,912,826 | 11/1959 | Tan | 91—412 |
| 2,913,061 | 11/1959 | Beyerstedt et al. | 180—51 X |
| 3,254,781 | 6/1966 | Zink | 214—501 |
| 3,279,630 | 10/1966 | Trieschmann | 214—78 |

ROBERT G. SHERIDAN, *Primary Examiner.*